US012623299B1

(12) United States Patent
Zhang

(10) Patent No.: US 12,623,299 B1
(45) Date of Patent: May 12, 2026

(54) ELECTRIC WELDING MACHINE

(71) Applicant: Hui Zhang, Taizhou (CN)

(72) Inventor: Hui Zhang, Taizhou (CN)

( * ) Notice: Subject to any disclaimer, the term of this patent is extended or adjusted under 35 U.S.C. 154(b) by 0 days.

(21) Appl. No.: 18/625,586

(22) Filed: Apr. 3, 2024

(30) Foreign Application Priority Data

Jan. 27, 2024   (CN) ......................... 202410115824.7

(51) Int. Cl.
  *B23K 9/12* (2006.01)

(52) U.S. Cl.
  CPC .................................... *B23K 9/124* (2013.01)

(58) Field of Classification Search
  CPC ...... B23K 9/1336; B23K 9/133; B23K 9/173;
       B23K 9/125; B23K 9/16; B23K 9/295;
       B23K 9/1075; B23K 9/1081; B23K 9/12;
       B23K 9/124; B23K 9/1333; B23K 9/164;
       B23K 9/32; B23K 9/323
  USPC ..... 219/137.7, 137.9, 137.2, 137.31, 137.62,
       219/137.44, 137.51, 137.61, 137.63,
       219/137.71, 74, 75
  See application file for complete search history.

(56) References Cited

U.S. PATENT DOCUMENTS

| | | | | |
|---|---|---|---|---|
| 4,944,464 A | * | 7/1990 | Zelenka ................. | B23K 3/063 |
| | | | | 226/188 |
| 2004/0016741 A1 | * | 1/2004 | Evanyk ................... | A45D 20/12 |
| | | | | 219/492 |
| 2008/0210676 A1 | * | 9/2008 | Lambirth ............. | B23K 9/1006 |
| | | | | 219/130.1 |
| 2012/0152922 A1 | * | 6/2012 | Hung ..................... | B23K 9/323 |
| | | | | 219/136 |
| 2018/0021876 A1 | * | 1/2018 | Ellis ..................... | B23K 9/1081 |
| | | | | 219/74 |

FOREIGN PATENT DOCUMENTS

| | | | | |
|---|---|---|---|---|
| CN | 2325155 | Y | * | 6/1999 |
| CN | 203804434 | U | * | 9/2014 |
| CN | 206277021 | | * | 6/2017 |

* cited by examiner

*Primary Examiner* — Vy T Nguyen
(74) *Attorney, Agent, or Firm* — Cooper Legal Group, LLC

(57) ABSTRACT

An electric welding machine comprises a first base, a handle and a second base, the first base and the second base are connected to the handle, a welding gun barrel, a wire feeder and a wire feeding reel are provided on the first base, the wire feeder is configured to feed a welding wire from the wire feeding reel to the welding gun barrel, and a control mechanism configured to control the electric welding machine to work is provided on the second base. The control mechanism controls the wire feeder to feed the welding wire of the wire feeding reel to the welding gun barrel, and welding under the welding gun barrel.

12 Claims, 8 Drawing Sheets

ELECTRIC WELDING MACHINE

CROSS-REFERENCE TO RELATED APPLICATION

This application claims the priority and benefit of Chinese patent application No. 202410115824.7, filed on Jan. 27, 2024. The entirety of Chinese patent application No. 202410115824.7 is hereby incorporated by reference herein and made a part of this specification.

TECHNICAL FIELD

The present application generally relates to a field of a welding device, and in particular, to an electric welding machine.

BACKGROUND ART

An electric welding machine uses a high-temperature electric arc generated by instantaneous short circuit between positive pole and negative pole to melt a solder of a welding rod and a welded material, thereby facilitating a combination between the contacted objects. The electric welding machine is widely applied to every fields due to the advantages of using the electrical power, instantly converting the electrical energy to the thermal energy, and a strong weld seam after welding.

However, it is necessary for operators to feed the welding rod from the welding gun muzzle when the present electric welding machine is using, since the length of the welding gun is limited and the welding rod is relative short, it is necessary to supple the welding rod after welding for a period of time, which affects the welding efficiency, and is inconvenient to use.

SUMMARY

For improving the convenience of an electric welding machine, the electric welding machine of the present application is disclosed.

The electric welding machine according to the present application adopts following solution.

An electric welding machine comprises a first base, a handle and a second base, the first base and the second base are connected to the handle, a welding gun barrel, a wire feeder and a wire feeding reel are provided on the first base, the wire feeder is configured to feed a welding wire from the wire feeding reel to the welding gun barrel, and a control mechanism configured to control the electric welding machine to work is provided on the second base.

By adopting above solution, during use, the control mechanism controls the wire feeder to feed the welding wire from the wire feeding reel to the welding gun barrel, and welding under the welding gun barrel. The welding wire of the present electric welding machine can be coiled around the wire feeding reel, the welding wire provided at one time is relative long, and the welding wire after replacing one time can be used for a long time, which can reduce replacing times for the welding person, thereby improving a use convenience and a welding efficiency.

Preferably, the first base is provided with a first cavity for accommodating the wire feeder and a second cavity for accommodating the wire feeding reel, and the first cavity is in communication with the second cavity.

By adopting above solution, the wire feeder and the wire feeding reel are provided in the first base, which can reduce an impact of external environmental factors on them. The first cavity is in communication with the welding gun barrel and the second cavity, and the welding wire can be fed from the wire feeding reel of the second cavity to the welding gun barrel through the first cavity and under the wire feeder.

Preferably, the electric welding machine comprises an integrated cover plate for sealing the first cavity and the second cavity, the integrated cover plate has a first connection part and a second connection part, the first connection part is detachably connected to the first base, and the second connection part is detachably connected to or hinged with the first base.

By adopting above solution, when it is necessary to replace or maintain the inner elements of the first base, the integrated cover plate can be opened or token, which is convenience to replace and maintain.

Preferably, the integrated cover plate comprises a first plate for sealing the first cavity and a second plate for sealing the second cavity, the first plate is connected to the second plate, the second connection part is provided on the first plate, the second connection part is hinged with the first base, and a hinge joint axis between the second connection part and the first base is set along a length direction of the first base.

By adopting above solution, the hinge joint axis between the second connection part and the first base is set along the length direction, such that the integrated cover plate can be turned along a width direction of the first base, to realize a lateral turn.

Preferably, the integrated cover plate comprises a first plate for sealing the first cavity and a second plate for sealing the second cavity, the first plate is connected to the second plate, the second connection part is provided on the second plate, the second connection part is hinged with the first base, and a hinge joint axis between the second connection part and the first base is set along a width direction of the first base.

By adopting above solution, the hinge joint axis between the second connection part and the first base is set along the width direction of the first base, such that the integrated cover plate can be turned along a length direction of the first base, to realize a front-back turn.

Preferably, the electric welding machine comprises a first cover plate for sealing seal the first cavity and a second cover plate for sealing seal the second cavity, the first cover plate has a third connection part and a fourth connection part, the second cover plate has a fifth connection part and a sixth connection part, the third connection part and the fifth connection part are detachably connected to the first base, and the fourth connection part and the sixth connection part are detachably connected to or hinged with the first base.

By adopting above solution, when it is necessary to replace or maintain the inner elements of the first base, the first cover plate and/or the second cover plate can be opened, since the first cover plate and the second cover plate are corresponding to the first cavity and the second cavity, respectively, and the maintainer can open the corresponding first cover plate or second cover plate according to demand, which can reduce a risk of external interferences on elements that do not require maintenance inside the first base.

Preferably, an upper end of the handle is integrated with the first base, and a lower end of the handle is integrated with the second base.

By adopting above solution, the handle is integrated with the first base and the second base, which can reduce assembly processes, and improve an assembly efficiency.

Preferably, the upper end of the handle is integrated with the first base, and the lower end of the handle is detachably connected to the second base.

By adopting above solution, the handle is detachably connected to the second base, which is convenience to maintain.

Preferably, the welding gun barrel comprises a gun head, a barrel body and a deformable hose, one end of the hose is connected to the first base, the other end of the hose is connected to one end of the barrel body, and the other end of the barrel body is connected to the gun head.

By adopting above solution, the barrel body is connected to the first base via the hose, such that the position of the gun head connected to the barrel body can be changed, thereby realizing to weld at different angles, and facilitating to operate.

Preferably, a front or rear end of the second base is provided with a power line and an electrode line; or, the front end of the second base is provided with the power line, and the rear end of the second base is provided with the electrode line; or, the rear end of the second base is provided with the power line, and the front end of the second base is provided with the electrode line.

By adopting above solution, the power line can be connected to an external power supply, and the electrode line can be connected to a workpiece via an electrode clamp. Therefore, the electric energy can generate a tremendous electric arc heat to melt the welding wire and the workpiece, thereby completing the welding.

DETAILED DESCRIPTION

The present application is further described in detail below in combination with FIGS. 1-11.

Embodiment 1

Figure 1:
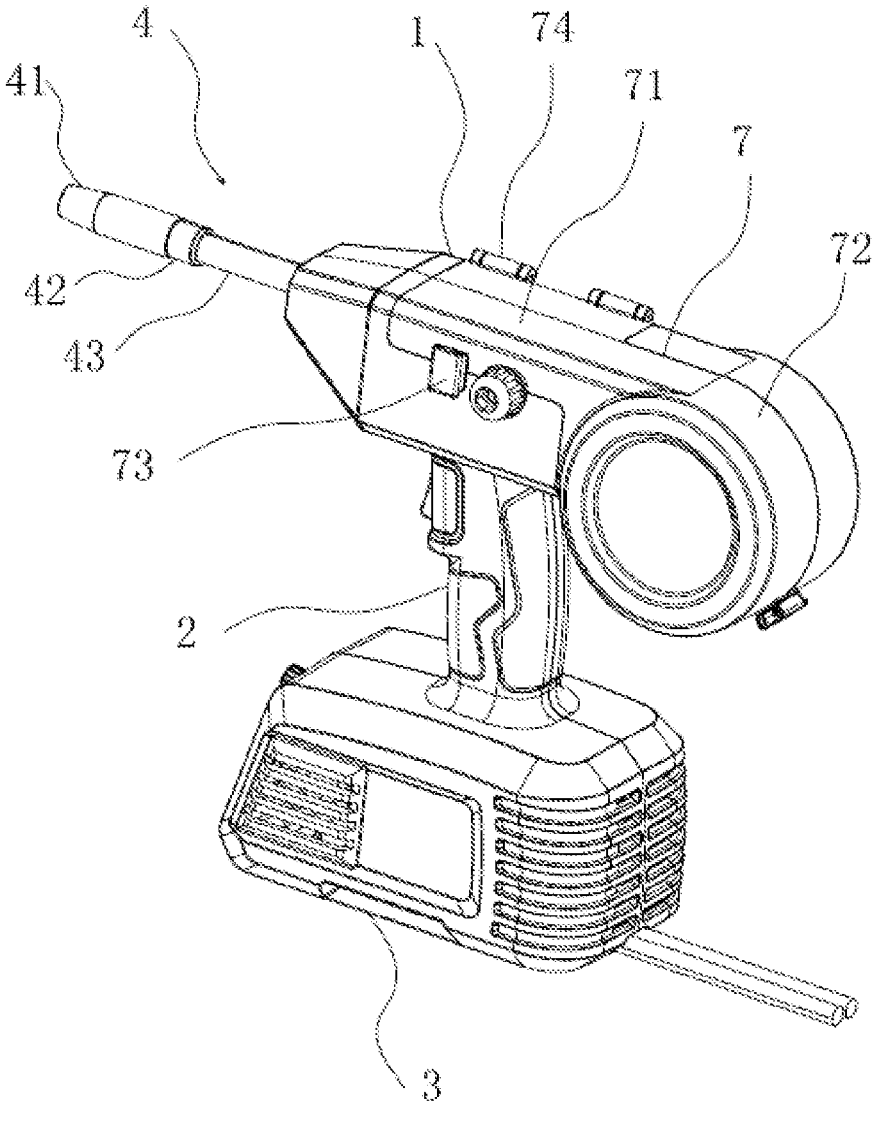
FIG. 1 is a schematic structure view of Embodiment 1 of the present application.
Figure 2:
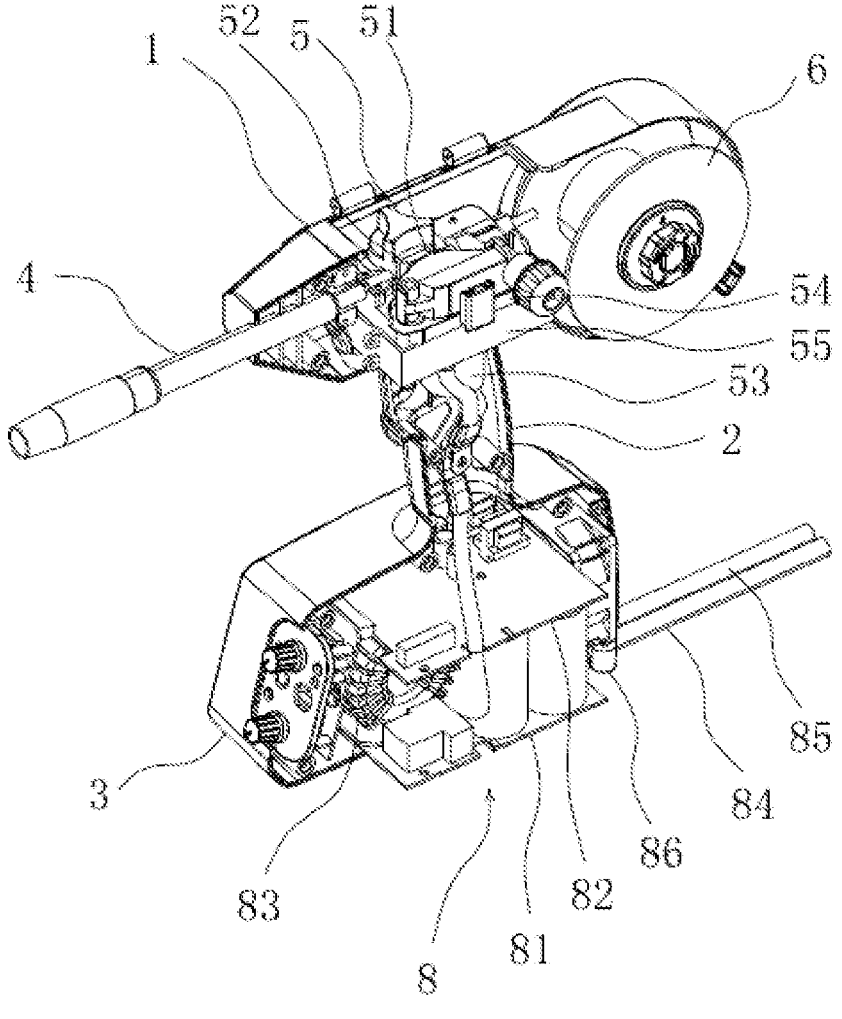
FIG. 2 is a schematic inner structure view of Embodiment 1 of the present application.

Referring to FIGS. 1-2, the electric welding machine includes a first base 1, and a handle 2, the first base 1 is connected to the handle 2, a welding gun barrel 4, a wire feeder 5 and a wire feeding reel 6 are provided on the first base 1, and the wire feeder 5 can feed the welding wire from the wire feeding reel 6 to the welding gun barrel 4.

In the present application, the welding gun barrel 4 is provided on the front end of the first base 1, the wire feeding reel 6 is provided on the rear end of the first base 1, and the wire feeder 5 is positioned between the welding gun barrel 4 and the wire feeding reel 6.

Preferably, the welding gun barrel 4 includes a gun head 41, a barrel body 42 and a deformable hose 43, one end of the hose 43 is connected to the first base 1, the other end of the hose 43 is connected to one end of the barrel body 42, and the other end of the barrel body 42 is connected to the gun head 41. The barrel body 42 is connected to the first base 1 via the hose 43, such that the position of the gun head 41 connected to the hose 43 is changeable, which can realize to weld at different angles, and facilitate to operate.

In the present application, the hose 43 can adopts a metal hose, is combined by a corrugated flexible pipe, a mesh sleeve and a joint, and has a great flexibility and durability.

In some embodiments, the welding gun barrel 4 can further adopt a hard material, such as a carbon steel, a stainless steel, and aluminum alloys and so on.

Referring to FIGS. 1-2, the first base 1 is provided with a first cavity 11 for accommodating the wire feeder 5 and a second cavity 12 for accommodating the wire feeding reel 6, and the first cavity 11 is in communication with the welding gun barrel 4 and the second cavity 12.

In particular, a feeding wire block 54 is fixed in the first cavity 11, and fixed on the first base 1 via a support 55. The feeding wire block 54 is rotatably provided with a main wire feeding roll 51, a secondary wire feeding roll 52 and an electric machine 53, the axis of the main wire feeding roll 51 is parallel to the axis of the secondary wire feeding roll 52, and the main wire feeding roll 51 and the secondary wire feeding roll 52 are distributed at intervals to form a channel for the welding wire to pass through. The electric machine 53 is connected to the main wire feeding roll 51, the main wire feeding roll 51 rotates when the electric machine starts, and is matched with the secondary wire feeding roll 52, so as to feed the welding wire.

In the present application, the axes of the main wire feeding roll 51 and the secondary wire feeding roll 52 are provided along a height direction of the electric welding machine. In some embodiments, the axes of the main wire feeding roll 51 and the secondary wire feeding roll 52 can be provided along the width direction of the electric welding machine, or be adjusted according to a real demand.

Referring to FIGS. 1-2, the wire feeding reel 6 is provided in the second cavity 12 via a mounting shaft 61, and the mounting shaft 61 is connected to the first base 1. In the present application, the mounting shaft 61 is distributed along the width direction of the electric welding machine, the welding wire is coiled around the wire feeding reel 6, and can pass through a wire guiding part to the channel between the main wire feeding roll 51 and the secondary wire feeding roll 52.

Referring to FIGS. 1-2, the electric welding machine includes an integrated cover plate 7 simultaneously sealing the first cavity 11 and the second cavity 12, the integrated cover plate 7 has a first connection part 73 and a second connection part 74, the first connection part is detachably connected to the first base 1, and the second connection part is detachably connected to or hinged with the first base 1.

In the present application, the integrated cover plate 7 includes a first plate 71 for sealing the first cavity 11 and a second plate 72 for sealing the second cavity 12, the first plate 71 is connected to the second plate 72, the second connection part 74 is provided on the first plate 71, the second connection part 74 is hinged with the first base 1, and the hinge joint axis between the second connection part 74 and the first base 1 is set along the length direction of the first base 1, such that the integrated cover plate 7 can be turned along the width direction of the first base 1, to realize a lateral turn.

Preferably, the first plate 71 is integrated with the second plate 72, and in some embodiments, the first plate 71 can be divided to the second plate 72, which is fixed by the connector or welding, thereby realizing to open or close at same time.

In particular, the first connection part 73, the second connection part 74 and the first base 1 are detachably connected to each other, the connection way of which can be snap, threated and so on.

Figure 3:
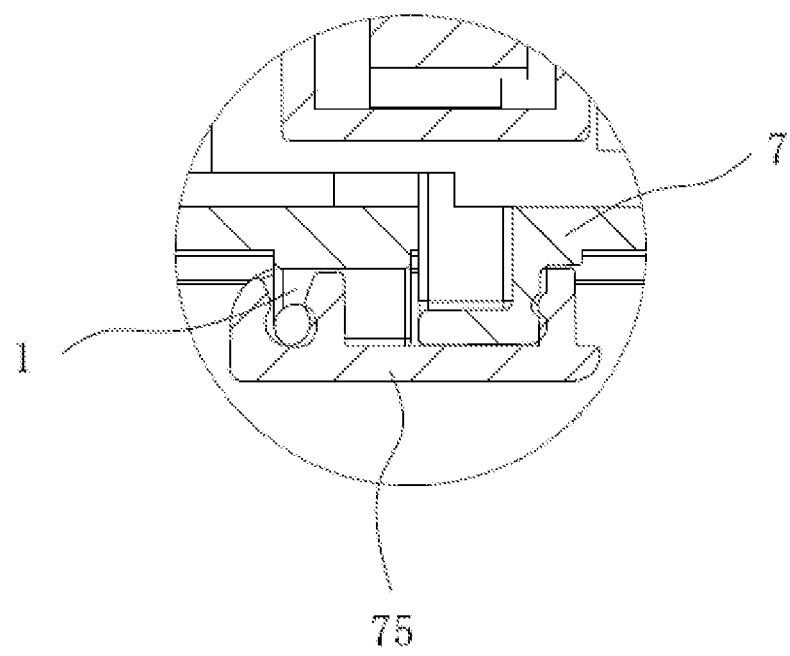
FIG. 3 is a schematic snap structure view of an integrated cover plate and a first base of Embodiment 1 of the present application.

Referring to FIGS. 1 and 3, the first connection part 73 includes a snap sheet 75, one end of the snap sheet 75 is hinged with the integrated cover plate 7, and the other end of the snap sheet 75 can be snapped with the first base 1. When the second connection part 74 is necessary to be snapped with the first base 1, similar structures of which can be adopted.

Referring to FIGS. 1-2, the electric welding machine further includes a second base 3, and the second base 3 is connected to the handle 2. The second base 3 is provided with a control mechanism 8 configured to control the electric welding machine to work.

In the present application, the control mechanism 8 includes a controller 81, a circuit board 82 and a transformer 83, the controller 81 is connected to the electric machine 53, and sends an instruction to the electric machine 53. The front or rear end of the second base 3 is provided with a power line 84 and an electrode line 85; or, the front end of the second base 3 is provided with the power line 84, and the rear end of the second base 3 is provided with the electrode line 85; or, the rear end of the second base 3 is provided with the power line 84, and the front end of the second base 3 is provided with the electrode line 85. The second base 3 has a snap-fit block 86 for fixing the power line 84 and/or electrode line 85.

Referring to FIGS. 1-2, in the present application, the first base 1 is positioned on the upper end of the handle 2, the second base 3 is positioned on the lower end of the handle 2, preferably, the upper end of the handle 2 is integrated with the first base 1, and the lower end of the handle 2 is integrated with the second base 3.

In particular, the integrate structure of the first base 1, the handle 2, and the second base 3 can be divided into two half housings connected to each other along the height direction of the electric welding machine, two half housings are provided with threated holes, respectively, which is convenience to connect two half housings.

In some embodiments, the handle 2, the first base 1 and the second base 3 can adopt the welding, the threaded connection and other connection ways.

The first base 1 can be provided on the lower end of the handle 2, the second base 3 is provided on the upper end of the handle 2, or the first base 1 and the second base 3 are positioned on the same end of the handle 2.

The principle of the present application is as follows: during the use, the controller 81 sends the instruct to the electric machine 53, the electric machine 53 rotates the main wire feeding roll 51, and the main wire feeding roll 51 is matched with the secondary wire feeding roll 52 to feed the welding wire from the wire feeding reel 6 to the welding gun barrel 4, and welding under the welding gun barrel 4.

6

Embodiment 2

Figure 4:
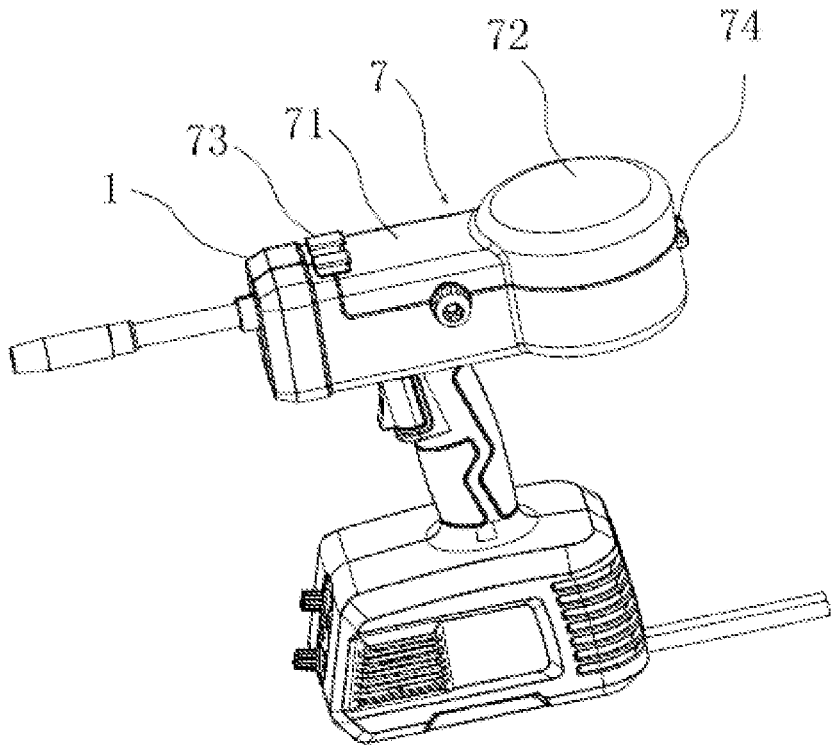
FIG. 4 is a schematic structure view of Embodiment 2 of the present application.
Figure 5:
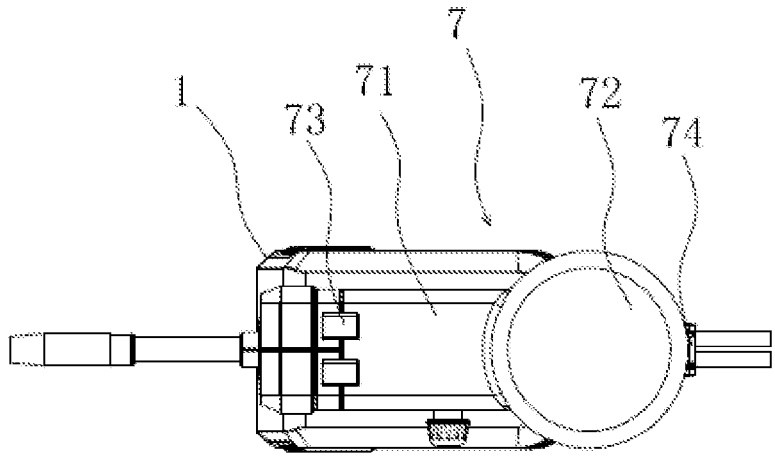
FIG. 5 is a vertical view of Embodiment 2 of the present application.
Figure 6:
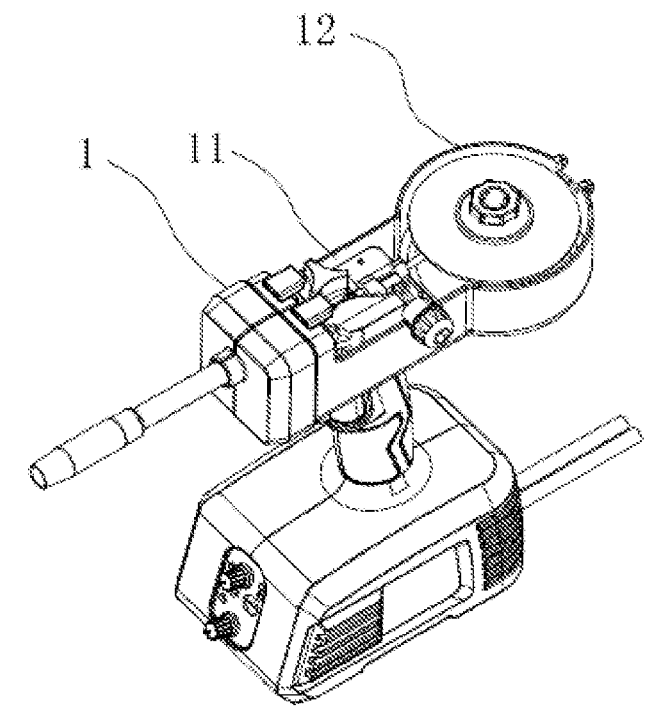
FIG. 6 is a schematic inner structure view of Embodiment 2 of the present application.

Referring to FIGS. 4-6, the present Embodiment is similar to Embodiment 1, the difference of which is as follows: in the present application, an integrated cover plate 7 includes a first plate 71 for sealing a first cavity 11 and a second plate 72 for sealing a second cavity 12, the first plate 71 is connected to the second plate 72, the second connection part 74 is provided on the second plate 72, the second connection part 74 is hinged with the first base 1, and a hinge joint axis of the second connection part 74 and the first base 1 is provided along the width direction of the first base 1, such that the integrated cover plate 7 can be turned along a length direction of the first base 1, to realize a front-back turn.

The first plate 71 is integrated with the second plate 72, and in some embodiments, the first plate 71 and the second plate 72 can adopt a divided structure, and are connected to each other by the welding, the threaded connection and other connection ways, thereby realizing to open or close at same time.

Preferably, the second connection part 74 is provided on the rear end of the second plate 72, and the first connection part 73 is provided on the front end of the first plate 71.

Embodiment 3

Figure 7:
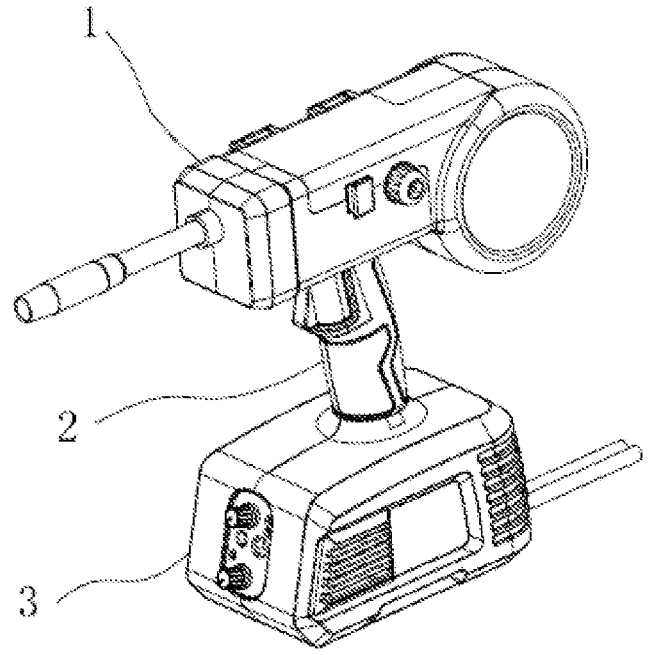
FIG. 7 is a schematic structure view of Embodiment 3 of the present application.
Figure 8:
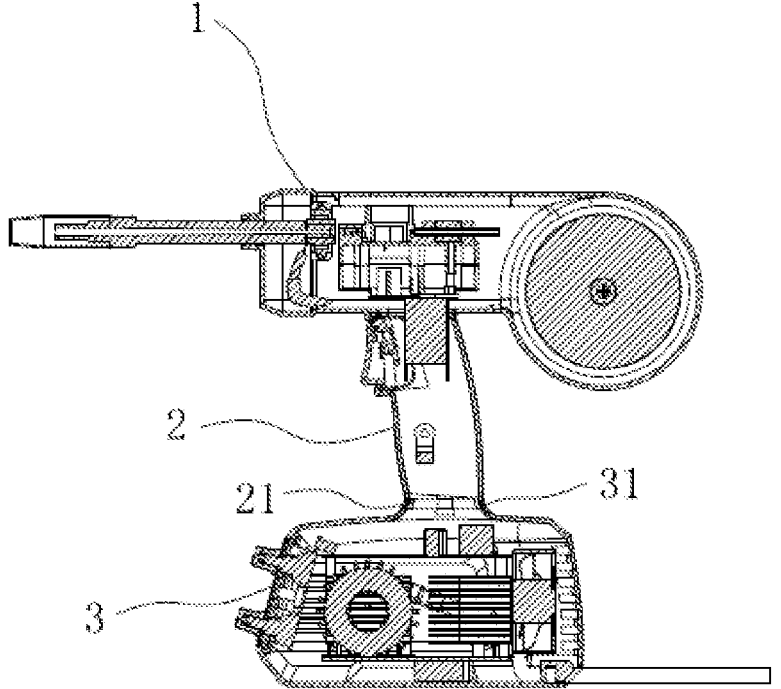
FIG. 8 is a schematic inner structure view of Embodiment 3 of the present application.

Referring to FIGS. 7-8, the present Embodiment is similar to Embodiment 1, the difference of which is as follows: in the present application, the upper end of the handle 2 is integrated with the first base 1, and the lower end of the handle 2 is detachably connected to the second base 3.

In the present application, the lower end of the handle 2 is snapped with the second base 3, preferably, the lower end of the handle 2 has a first snap ring 21, the upper surface of the second base 3 is provided with a second snap ring 31, the first snap ring 21 is snapped with the second snap ring 31.

In some embodiments, the handle 2 can be detachably connected to the second base 3 via screws and so on.

Embodiment 4

Figure 9:
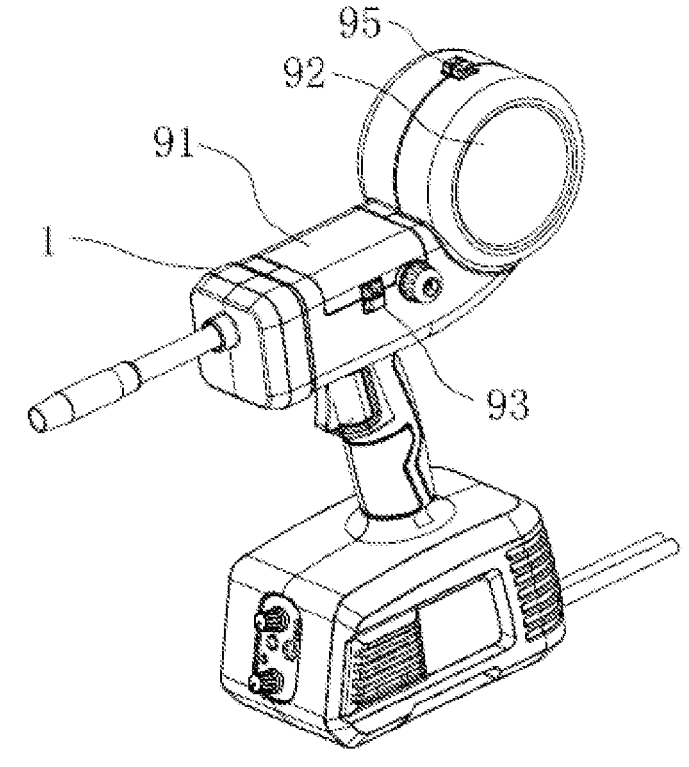
FIG. 9 is a schematic structure view of Embodiment 4 of the present application.
Figure 10:
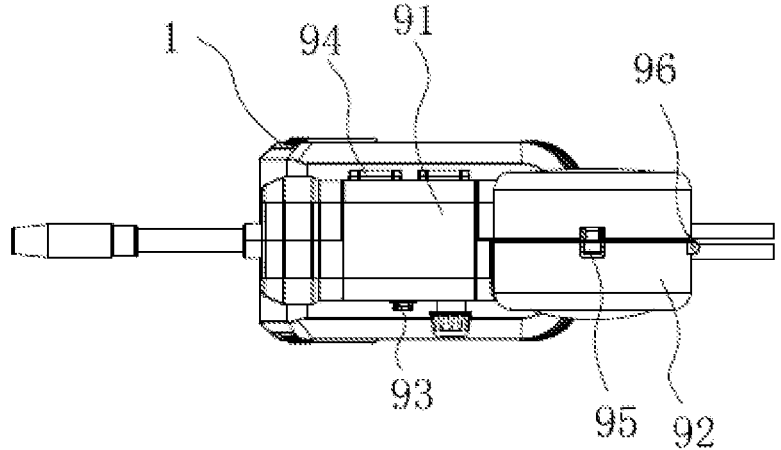
FIG. 10 is a vertical view of Embodiment 4 of the present application.
Figure 11:
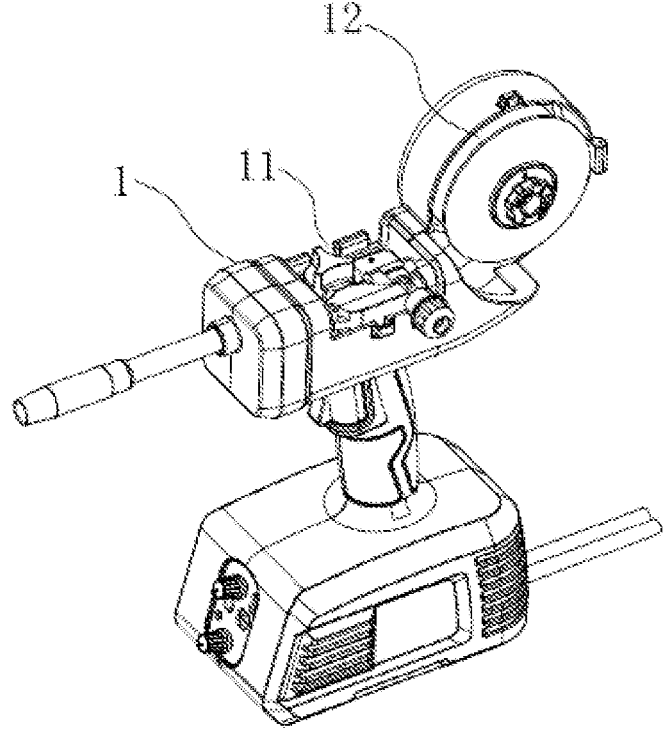
FIG. 11 is a schematic inner structure view of Embodiment 4 of the present application.

Referring to FIGS. 9-11, the present Embodiment is similar to Embodiment 1, the difference of which is as follows: in the present application, the electric welding machine includes a first cover plate 91 for sealing the first cavity 11 and a second cover plate 92 for sealing the second cavity 12, the first cover plate 91 has a third connection part 93 and a fourth connection part 94, the second cover plate 92 has a fifth connection part 95 and a sixth connection part 96, the third connection part 93 and the fifth connection part 95 are detachably connected to the first base 1, and the fourth connection part 94 and the sixth connection part 96 are detachably connected to or hinged with the first base 1. When it is necessary to replace the welding wire or maintain the inner elements of the first base 1, the first cover plate 91 and/or the second cover plate 92 can be opened.

In the present application, the third connection part 93 and the fifth connection part 95 can be snapped with the first base 1, the specific structure of which is similar to the first connection part 73, the hinge joint axis between the fourth connection part 94 and the sixth connection part 96 with the first base 1 is set along the length direction of the first base 1, such that the first cover plate 91 and the second cover plate 92 can be turned along the width direction of the first base 1, thereby reducing the possibility of interference when the first cover plate 91 and the second cover plate 92 open or close at same time.

The above are the preferred embodiments of the present application, which are not intended to limit the protection scope of the present application. Therefore, all equivalent changes made according to the structure, shape and principle of the present application should be covered within the protection scope of the present application.

LIST OF REFERENCE SIGNS 1 first base
11 first cavity
12 second cavity
2 handle
21 first snap ring
3 second base
31 second snap ring
4 welding gun barrel
41 gun head
42 barrel body
43 hose
5 wire feeder
51 main wire feeding roll
52 secondary wire feeding roll
53 electric machine
54 wire feeding block
55 support
6 wire feeding reel
61 mounting shaft
7 integrated cover plate
71 first plate
72 second plate
73 first connection part
74 second connection part
75 snap sheet
8 control mechanism
81 controller
82 circuit board
83 transformer
84 power line
85 electrode line
86 snap-fit block
91 first cover plate
92 second cover plate
93 third connection part
94 fourth connection part
95 fifth connection part
96 sixth connection part

What is claimed is:

1. An electric welding machine, comprising: a first base, a handle and a second base, wherein, the first base and the second base are connected to the handle; a welding gun barrel, a wire feeder and a wire feeding reel are provided in the first base; the wire feeder is configured to feed a welding wire from the wire feeding reel to the welding gun barrel; a control mechanism configured to control operations of the electric welding machine is provided on the second base;

wherein the control mechanism comprises a controller, a circuit board and a transformer, the controller, the circuit board and the transformer are arranged on the second base, the controller is connected to an electric machine and sends an instruction to the electric machine, and the electric machine is configured to drive the wire feeder, so that the control mechanism controls the wire feeder to feed the welding wire from the wire feeding reel to the welding gun barrel through the electric machine.

2. The electric welding machine according to claim 1, wherein the first base is provided with a first cavity for accommodating the wire feeder and a second cavity for accommodating the wire feeding reel, and the first cavity is in communication with the welding gun barrel and the second cavity.

3. The electric welding machine according to claim 2, further comprising an integrated cover plate for sealing the first cavity and the second cavity, wherein the integrated cover plate has a first connection part and a second connection part, the first connection part is detachably connected to the first base, and the second connection part is detachably connected to or hinged with the first base.

4. The electric welding machine according to claim 3, wherein the integrated cover plate comprises a first plate for sealing the first cavity and a second plate for sealing the second cavity, the first plate is connected to the second plate, the second connection part is arranged on the first plate, the second connection part is hinged with the first base, and a hinge joint axis between the second connection part and the first base is arranged along a length direction of the first base.

5. The electric welding machine according to claim 3, wherein the integrated cover plate comprises a first plate for sealing the first cavity and a second plate for sealing the second cavity, the first plate is connected to the second plate, the second connection part is arranged on the second plate, the second connection part is hinged with the first base, and a hinge joint axis between the second connection part and the first base is arranged along a width direction of the first base.

6. The electric welding machine according to claim 2, further comprising a first cover plate for sealing the first cavity and a second cover plate for sealing the second cavity, wherein the first cover plate has a third connection part and a fourth connection part, the second cover plate has a fifth connection part and a sixth connection part, the third connection part and the fifth connection part are detachably connected to the first base, and the fourth connection part and the sixth connection part are detachably connected to or hinged with the first base.

7. The electric welding machine according to claim 1, wherein an upper end of the handle is integrated with the first base, and a lower end of the handle is integrated with the second base.

8. The electric welding machine according to claim 1, wherein an upper end of the handle is integrated with the first base, and a lower end of the handle is detachably connected to the second base.

9. The electric welding machine according to claim 1, wherein a power line and an electrode line are provided at a front or rear end of the second base.

10. The electric welding machine according to claim 1, wherein a power line is provided at a front end of the second base, and an electrode line is provided at a rear end of the second base.

11. The electric welding machine according to claim 1, wherein a power line is provided at a rear end of the second base, and an electrode line is provided at a front end of the second base.

12. The electric welding machine according to claim 1, wherein the welding gun barrel comprises a gun head, a barrel body and a deformable hose; a first end of the deformable hose is connected to the first base; a second end of the deformable hose is connected to a first end of the barrel body; and a second end of the barrel body is connected to the gun head.

* * * * *